Sept. 24, 1968 R. C. THOMPSON 3,403,269
FREQUENCY RESPONSIVE RC TIMING CIRCUIT FOR DETECTING EITHER LACK OF INPUT OR OVEREXTENDED PRESENCE OF INPUT
Filed April 25, 1966
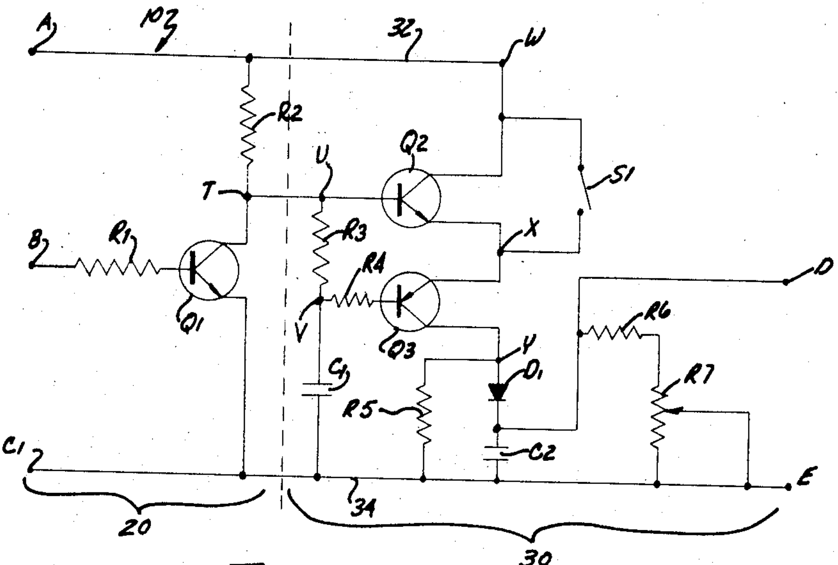
FIG. 1
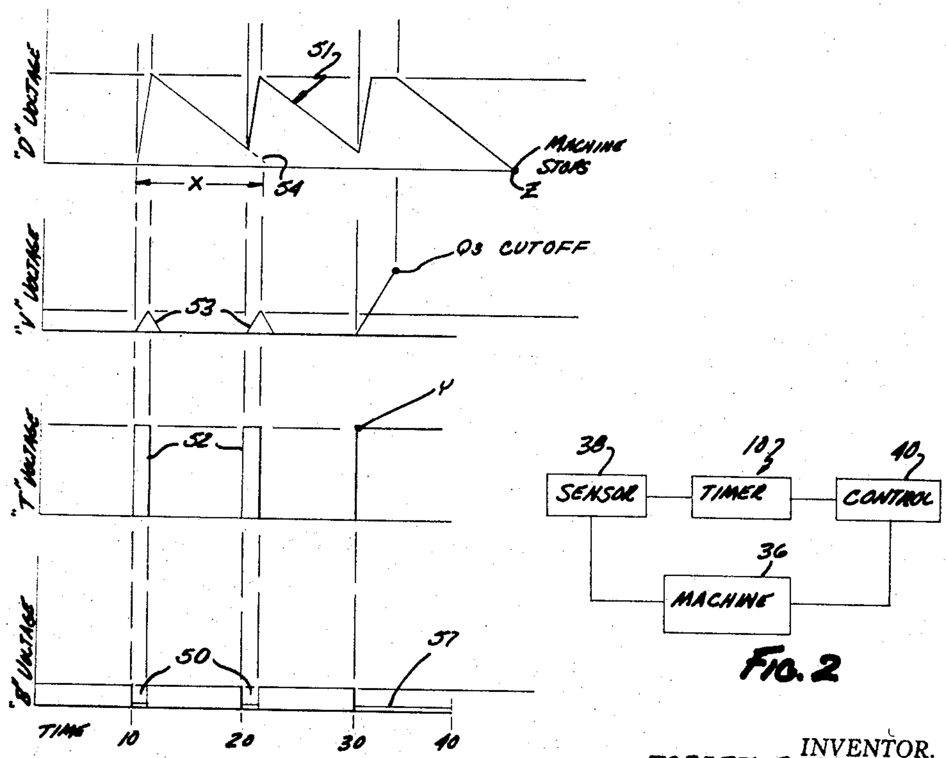
FIG. 2
FIG. 3
INVENTOR.
ROBERT C. THOMPSON
BY [signature]
ATTORNEYS United States Patent Office 3,403,269

Patented Sept. 24, 1968

3,403,269

FREQUENCY RESPONSIVE RC TIMING CIRCUIT FOR DETECTING EITHER LACK OF INPUT OR OVEREXTENDED PRESENCE OF INPUT

Robert C. Thompson, Muskegon, Mich., assignor to Techrand Corporation of America, Muskegon, Mich., a corporation of Michigan Filed Apr. 25, 1966, Ser. No. 545,080
13 Claims. (Cl. 307—293)

ABSTRACT OF THE DISCLOSURE

A circuit having a pair of time-controlled switch stages which produces a continuous output voltage exceeding a predetermined minimum in response to regularly-pulsing input signals, in which one such switch stage responds to the absence of such input signals by interrupting the output voltage and the other such switch stage responds to a steady or non-pulsing input signal condition by similarly interrupting the output voltage.

This invention relates to an electrical timing circuit, and more particularly to a timing circuit which accurately detects the presence of a pattern of predetermined electrical signals.

In electronic control systems which sense a particular parameter of machine operation and utilize the sensed signals to effect control of that parameter, it is often a requirement that specific recurring operations or operative steps be sensed; that is, after one signal has been received, it is frequently desired to keep the machine operating until subsequent times have arrived when other such recurring signals are expected to be sensed. Should any one of the subsequent signals fail to occur (thus indicating a breakdown of the machine or other irregularity in its operation) then in this case the control apparatus is to stop the machine from further operation, so that the problem may be remedied or repairs made to the machine. Moreover, a most desirable attribute of a timer which is capable of producing this operation is the ability to anticipate the somewhat unlikely possibility that the machine will suffer a failure at the precise moment in its operation during which the sensor is detecting the guiding parameter. Should this situation actually arise, the sensor would normally continue to provide a continuous signal to the control apparatus indicating correct machine operation. Consequently, the control would not interrupt the operation of the machine as is desired and it would remain in an energized condition, resulting in very great damage to the machine. Thus, a genuinely reliable and trustworthy control system should include a timer which would detect not only the failure of expected recurring sensed signals to exist, but also the continuous presence of a sensed signal.

It is a principal objective of the present invention to provide a timer capable of regularly and unfailingly providing both aspects of the above-mentioned operation.

It is another object of this invention to provide a timer having such a dual operation which is completely electronic, and which is capable of operating at very low input signal levels, so as to accommodate a very great variety of possible sensing devices.

Still another object of the present invention is to provide a timer capable of providing the dual operation noted, and yet which by a simple adjustment may be made to provide only one of the two operational features instead of both.

At still further object of this invention is to provide a timer having all of the above features, and yet which is entirely solid state and accordingly has a prolonged lifetime of trouble-free and economical operation, and which further may be initially constructed very economically and with a minimum of labor expense.

These and other objects of this invention, together with many advantages enjoyed by its usage, will become increasingly apparent following a consideration of the ensuing specification and its appended claims, when taken in conjunction with the accompanying drawings setting forth a preferred embodiment thereof.

In the drawings:

FIG. 1 is a schematic representation of the circuitry employed in the timer;

FIG. 2 is a block diagram of an illustrative control system in which the inventive timing circuit operates to advantage; and FIG. 3 is a number of time comparative graphs illustrating voltages at certain points on the circuit of FIG. 1.

Briefly stated, the present invention is of a timing circuit which is composed of a novel arrangement of transistor switches, and which includes certain RC timing networks for providing carefully timed operation of the transistor switches. The timing circuit operates in response to a recurring or pulsed input signal to produce a continuous output voltage by "bridging" or prolonging the effects of each pulse over a desired period of time calculated to be just long enough to cover the period between two pulses. The absence of any one pulse prohibits such "bridging" and cuts off the output voltage. Also, should any one or more pulses have an unexpectedly long duration or should the pulses change to a continuous signal another RC network undergoes a full charging cycle, which results in one of the transistors being switched to cut off the output voltage.

Referring now in more detail to the drawings, FIG. 2 discloses an exemplary schematic diagram showing in block form a machine 36, a sensor 38, a timer 10 connected to the sensor and a control 40 connected to the timer and the machine. The sensor 38 can be electrically connected to the machine for sensing a predetermined operation, or can be mechanically associated therewith to sense an operation or operative step of the machine. By way of example only, the sensor 38, in the interval between sensing predetermined operations or operative steps of the machine, causes a positive voltage to appear at the input to the timer 10, designated connection point B (FIG. 1). However, when the sensor 38 senses a predetermined operation or operative step of the machine the voltage at the point B drops to zero (or thereabouts) thereby in effect creating negative pulses 50 (FIG. 3). The timer 10, which will be described hereinafter, is responsive to these pulses appearing at point B and accordingly causes changes in voltage to appear at points T and V, such voltages in this case being a series of pulses 52 at T and 53 at V. The control 40 is responsive to the voltage appearing at the timer output, designated connection point D, to cause a variation in the operation of the machine 36 to either change its operation, stop it completely, or give an indication on an indicator (not shown). It should be understood that the timer mechanism 10 has many other uses and the example as illustrated is merely selected as one use for the timer.

In FIG. 1 the timing circuit 10 is seen to comprise two basic stages, an input stage 20, and an output stage 30. Stage 20 has a power input terminal A, which is connected to conductor 32, a signal input terminal B, and a ground terminal C, connected to conductor 34. These terminals serve to connect in circuit a first transistor Q1, which is illustrated as being of the NPN configuration. A signal-developing resistor R1 interconnects signal input terminal B with the base of transistor Q1, and resistor R2 interconnects power terminal A and conductor 32 with the collector of this transistor, at circuit connection point T, for purposes which more fully appear in the subsequent discussion of the operation of the circuit. The transistor emitter connects directly to ground conductor 34.

The second stage 30 of the timer includes a pair of series-connected switching transistors Q2 and Q3, which for purposes set forth hereinafter are of opposite conductivity characteristics; that is, one of them (say, for example, Q2) is an NPN type, whereas the other (for example, Q3) is a PNP transistor. Transistor Q2 is connected at circuit point W to power conductor 32, which carries supply voltage introduced at point A. Transistors Q2 and Q3 are connected together in series, as by their emitter electrodes, at point X. Transistor Q3 is connected by its collector (at circuit connection Y) to one side of current-limiting resistor R5, which is connected at its other end to ground conductor 34.

The base of transistor Q2 is connected at circuit point T to the collector of first stage transistor Q1, and to resistor R2 of this stage. The base of transistor Q2 is also connected, at circuit point U, to one end of resistor R3, whose other end connects to circuit point V. Circuit point V further communicates with the base of transistor Q3 through base resistor R4. Further, capacitor C1 is interposed between point V and conductor 34, at ground potential. It should be noted that the collector and emitter of transistor Q2 are bridged by a shorting circuit controlled by a switch S1. This transistor may thus be shorted out and effectively removed from the operation of the circuit, whenever desired and for as long a period of time as is desired. When this occurs, circuit connection point X is connected directly to power conductor 32, and hence is at the constant potential present at point W.

The output of the timing circuit 10 is present between terminals D and E, the latter being connected to conductor 34 and therefore being at ground potential. Terminal D, on the other hand, is connected to the junction of capacitor C2 (whose other side is grounded to ground conductor 34) and diode D1. This diode is interposed between capacitor C2 and the collector electrode of transistor Q3, connected to the diode at circuit point Y. As seen in FIG. 1, diode D1 is connected so as to pass positive pulses of voltage from transistor Q3 to capacitor C2 and to terminal D, and to block negative voltage pulses. Thus, capacitor C2 will be charged, if at all, by the current flowing through transistor Q3, which develops a voltage across resistor R5. Capacitor C2 will discharge, if at all, through fixed resistor R6 and variable resistor R7, which are connected across the capacitor to ground, and which determine the potential of signals present at output terminal D.

FIG. 3 discloses a graph of the signals appearing at the points B, T, V and D. In normal operation of the machine 36 the sensor 38, at predetermined intervals of units of time, senses an operation or operative step of the machine and produces a reduction in voltage or a negative pulse 50 at the connection point B. This causes the pulses 52 at points T and U and the pulses 53 at V. At point D the voltages controlled by capacitor C2 take a wave form similar to that shown by the D voltage graph.

If the machine is not operating properly the sensor will miss producing one of the negative pulses 50 and positive pulses 52 causing the machine to stop by reason of a loss in positive voltage at point D as will be described hereinafter. Further, the machine may possibly malfunction to cause the sensor 38 to continue to sense beyond the ordinary pulse time period. This causes, as will be described hereinafter, the voltage at point V to increase to a value at which Q3 is cut off, eventually causing the voltage at point D to fall to zero which results in control 40 stopping the machine. In other words, a continuous, constant pattern of pulses like pulses 50 and 52 will keep the machine 36 operating. However, failure of one of the pulses 50 or 52 to appear or the presence of pulses of substantially longer duration such as pulses 56 or 57 will cause stopping of the machine.

*Operation*

The operation of the timer circuit whose structural details have now been described will be illustrated by the following discussion, which assumes that the circuit is operating in a single one of the many environments to which it is readily adaptable.

Let it be assumed that the machine 36 of FIG. 2 is being controlled by the closed-loop system shown in this figure. Assume that the machine has a periodic, repetitive operation, which includes a rotating member whose normally continuous movement is sensed at a particular point in each rotation. It should be explicitly pointed out, however, that most any such operation is completely compatible with the timing circuit of this invention, and that the one to be discussed is merely exemplary. For example, the machine might instead be a conveying mechanism, in which case a regular succession of passing containers or the like would be what was being repeatedly sensed.

At any rate, each repetition in the operation of the machine 36 is detected by the sensor 38 as indicated at time unit intervals by negative pulses 50 (FIG. 3). For purposes of this example, it is assumed, as disclosed by FIG. 3, that the sensor supplies a steady voltage output during the times when it is inactive (i.e., not sensing), which output drops to zero during the times that the sensor detects the presence of the object being sensed.

In such an illustrative environment, input terminal B of the timer 10 will carry a continuous positive voltage during the periods of time during which the sensor 38 is quiescent and the machine 38 is carrying out one of its cycles of operation. Whenever sensor 38 detects the predetermined point in each cycle of operation which indicates that the machine is properly operating, the potential at terminal B of the timer drops to zero volts providing a pulse 50 (FIG. 3).

So long as the machine 36 continues to operate in its expected regularly repeating manner, the timer will indicate to the control apparatus 40 that the machine is to continue to operate without interruption. The timer does so by providing a continuous positive voltage 51 (FIG. 3) at its output terminal D. In the event that the machine 36 suffers a failure at some point in its operation and as a result a pulse does not appear, the timer will quickly indicate to the control apparatus 40 that a problem exists and that the machine 36 should be shut off. The timer accomplishes this by interrupting the steady voltage normally present at output terminal D, all in the following manner.

When the sensor 38 is actuated by the operation of the machine, the voltage normally introduced to the timer at terminal B and developed across resistor R1 is absent. Consequently, transistor Q1 no longer has a positive signal upon its base electrode, and so it is placed in a condition of non-conduction. When transistor Q1 is conducting, as is normally the case, its forward resistance is very very small, and circuit point T is effectively connected or short circuited to conductor 34 and ground potential. When transistor Q1 ceases to conduct due to actuation of the sensor, however, circuit point T suddenly is no longer connected to ground and it assumes a relatively high positive potential 52 (FIG. 3). Consequently, the base of transistor Q2 becomes positively biased, and this transistor enters a state of conduction. Meanwhile, the base of transistor Q3, which has a long charge period, is at a relatively low positive potential 53 (FIG. 3) and under these conditions this transistor continues to conduct. Thus, a closed circuit exists between point W, point Y, and through resistor R5 to ground.

With the first current flow occurring in this closed circuit, diode D1 passes current to capacitor C2, and it quickly becomes positively charged (see FIG. 3) to approximately the voltage level developed across resistor R5, since resistors R6 and R7 are chosen to have values much larger than that of resistor R5. The charging rate of capacitor C2 is very fast, since there is practically no resistance in series with it. Thus, practically as soon as the path from point W to point Y and ground became closed, capacitor C2 is fully charged and an output appears at terminal D. Conversely, diode D1 prevents the positive charge on capacitor C2 from returning to ground through relatively low resistance R5, and compels this capacitor to discharge through the combined resistance of resistor R6 and variable resistor R7, thereby perpetuating the output voltage at point D. Since it discharges through a relatively high resistance, the discharge rate of capacitor C2 is very much longer than its charging rate, which is practically instantaneous. For example, if capacitor C2 is selected to have a value of five hundred microfarads, and if the combined resistance of resistors R6 and R7 is slightly larger than one megohm, then the discharge rate of this network approaches ten minutes in length, during most of which time output terminal D continues to carry a slowly decreasing positive voltage (FIG. 3). In summary then, it may be stated that the result of sensor 38 having sensed that machine 36 is properly in operation is that the timer 10 continuously presents a positive voltage at its output terminal D.

Now, since the machine 36 continues to operate, it enters its next succeeding cycle of operation, during which sensor 38 is inactive while it awaits the conclusion of the operational cycle. Accordingly, input terminal B of the timer is impressed with a continuous positive voltage which is applied to the base of transistor Q1, driving this transistor into conduction. As stated above, when transistor Q1 conducts it effectively connects circuit point T to the ground potential of conductor 34, and consequently circuit point U and the base of transistor Q2 now carry practically no voltage.

Under this condition, transistor Q2 is at cutoff, and an open circuit exists between its collector and emitter electrodes. Therefore, even though transistor Q3 is still in a state of conduction, there is no closed path from the positive potential existing at circuit point W, and no current flows through the two switching transistors Q2 and Q3. At this time, there is no charging voltage developed across resistor R5, and consequently capacitor C2 begins its long discharge through resistors R6 and R7, thereby maintaining a voltage output at terminal D even though there is an open circuit between circuit points W and Y.

In order for the timer to properly bridge the desired time interval, the discharge time of capacitor C2 is adjusted (by means of resistor R7) so as to be somewhat in excess of the normal length of time required to complete one cycle of machine operation. The output voltage appearing at terminal D as a result of the presence of the output signal from sensor 38 will thus continue to be present until the sensor once again detects a completed cycle of machine operation and causes a repetition of the operation described above, during which a closed circuit is established through transistors Q2 and Q3, for providing an output at terminal D and a voltage for recharging capacitor C2.

On the other hand, should the machine malfunction during its cycle of operation, the sensor 38 would fail to provide the expected pulse signal 50 at the expected time, and consequently instead of being recharged, capacitor C2 would be allowed to continuously discharge as illustrated by broken line 54 on the D voltage graph of FIG. 3. Thus, in the event that the sensor 38 fails to detect continued normal operation of the machine, the output voltage at terminal D of the timer will disappear, since capacitor C2 will then have completely discharged. When this occurs, the control 40 immediately stops the operation of the machine.

Although it is somewhat improbable, it is nonetheless possible that the machine 36 could suffer a breakdown at the precise position in which sensor 38 is detecting a completed cycle of proper operation by the machine. Normally, such detection would indicate that operation should continue. In a situation like this, precisely at the moment when sensor output has dropped to about zero (indicated at 57, FIG. 3, transistor Q1 is at cutoff, circuit points T and U and the base of transistor Q2 are at a high positive potential (indicated at point Y), causing transistor Q2 to conduct, and the timer is supplying an output voltage, thereby indicating to the control 40 that the machine is operating normally, when in fact it is not.

The present inventive timing circuit anticipates even such a remote failure as this, however, for under such a condition it is to be noted that the high positive voltage present at circuit points T and U causes capacitor C1 to charge, at a rate determined by the time constant of itself and resistor R3. This charging rate is preferably of a duration only slightly longer than the normal pulse of the sensor resulting from its having sensed the end of a completed cycle of machine operation. Normally, the sensor 38 produces a rapid negative-going pulse, which takes less than one-half second to occur. Thus, if resistor R3 is selected to be forty-seven kilo-ohms, and capacitor C1 selected to be ten microfarads, it will take .47 second for capacitor C1 to charge to substantially the same voltage present at circuit points T and U. However long a time is selected for this to occur, when the sensor fails to charge its output in the usual length of time due to the failure of the machine, capacitor C1 continues to charge and so becomes fully charged. At this point, circuit point V and the base of transistor Q3 also carry the positive potential present on condenser C1. Since transistor Q3 is of the PNP variety, the positive voltage on its base will cause it to be cut off. (See Q3 cut-off on V voltage chart of FIG. 3.)

As this occurs, the path from circuit point W through resistor R5 to ground is opened, just as though transistor Q2 had been driven into cut-off, as is usually the case. Once again, when the path from point W to ground is opened, capacitor C2 will be allowed to completely discharge (see point Z on D voltage chart of FIG. 3). When it has fully discharged, the voltage at timer output terminal D will have been removed, and control 40 will interrupt the operation of the machine. Since the charging rate of capacitor C1 is very fast, this entire operation takes practically no longer to shut down the machine 36 than does the type of failure where the machine is at some point in its operation between the points sensed by sensor 38.

It will thus be seen that the present timing circuit will detect either or both of the conditions where an input signal is present too long a time, or where such a signal fails to appear. Moreover, by the use of a switching transistor such as Q1 instead of merely using the signal voltage directly from sensor 38, the timer 10 is able to operate upon very small sensor voltages. Furthermore, the series switching arrangement provided by transistors Q2 and Q3 is able to provide practically as high an output voltage at terminal D as is needed to operate any given control, since the output voltage is not limited by sensor voltage.

In the event that the dual operation which has been here described is not needed, switch S1 is provided across the collector and emitter electrodes of transistor Q2, so that this transistor may be shorted out of operation. If this be done, the switching of transistor Q2 by transistor Q1 in the previous example is, of course, of no importance, since positive voltage is always present at circuit point X. In this configuration, the timer output at terminal D can only be interrupted by the charging of capacitor C1 and the resultant biasing of transistor Q3 into cut-off. That is, by the use of switch S1, the circuit will have been converted into one having a single mode of operation.

As will be appreciated by those skilled in the art, the operation of the present inventive timer may be reversed by selecting a sensor whose operation is the opposite of the one described above, i.e., by choosing a sensor which produces a positive pulse of voltage whenever it senses, and which has no output when it is quiescent and not sensing. Also, variations in polarities at given points in the circuit, and the on and off times of specific transistors may be reversed by selecting transistors having characteristics opposite from those shown in the illustrative embodiment disclosed herein. That is, the invention is not so much in the particular components shown here as in the unique way of switching these components in the coordinated and timed fashion which I have disclosed. Accordingly, all such modifications or alterations which embody the spirit of my invention and the concept underlying it are deemed by me to fall within the purview of my disclosure, and should be considered as included in the claims appended below unless expressly stated otherwise therein.

I claim:

1. An electronic timing circuit for indicating at its output terminal the presence at its input terminal of a pattern of predetermined electrical signals including a plurality of equally time spaced pulses, comprising: a voltage source; switching means for coupling said voltage source to said output terminal in response to each of said pulses of said input signals; a first timing means associated with said switching means and output terminal for maintaining after said switching means is opened at least a portion of said voltage at said output terminal and for a time longer than the time interval between said pulses; and a second timing means associated with said input and said switching means for causing said switching means to open whenever any of said pulses have a duration greater than a predetermined duration.

2. The timing circuit defined in claim 1, wherein said first and second timing means each comprises resistive-capacitive storage and discharge circuitry.

3. The timing circuit defined in claim 1, wherein said switching means comprises a pair of transistors connected in series between said voltage source and said output terminal.

4. The timing circuit defined in claim 3, wherein one of said transistors is cut off in response to each of said pulses, wherein the other such transistor is cut off in response to a predetermined cut-off voltage, and wherein said second timing means causes the appearance of said predetermined cut-off voltage whenever any of said pulses have a duration greater than a predetermined duration, thereby biasing said other transistor to cut-off and opening said switching means.

5. The timing circuit defined in claim 4, wherein said first and second timing means each comprises resistive-capacitive storage and discharge circuitry, said second timing means circuitry having a charge time of sufficient length to prevent the charge on said second resistive-capacitive storage and discharge circuitry to reach said predetermined cut-off voltage within the normal time duration of said pulse, such charge time to said predetermined cut-off voltage being less than the time interval between pulses.

6. The device of claim 4 in which means are provided to short the said one transistor.

7. The device of claim 5 in which means are provided to short the said one transistor.

8. The timing circuit defined in claim 1, wherein said first switching means is connected to said voltage source such that in one switching condition it short circuits said source, said first switching means having an input on which said input signals are placed and an output at which appear pulse signals corresponding in time duration and time spaced relationship to said input signals, and said second switching means is connected to and controlled by said first switching means and couples said voltage source to said circuit output terminal in response to each of said pulses.

9. The timing circuit defined in claim 8, wherein said first and second timing means each comprises resistive-capacitive storage and discharge circuitry.

10. The timing circuit defined in claim 8, wherein said switching means comprises a pair of transistors connected in series between said voltage source and said output terminal, one of said transistors being cut off in response to each of said pulses and the other transistor being cut off in response to predetermined cut-off voltage, and wherein said second timing means causes the appearance of said predetermined cut-off voltage whenever any of said pulses have a duration greater than a predetermined duration, thereby biasing said other transistor to cut off and opening said switching means.

11. The timing circuit defined in claim 10, wherein said first and second timing means each comprises resistive-capacitive storage and discharge circuitry, said second timing means circuitry having a charge time of sufficient length to prevent the charge on said second resistive-capacitive storage and discharge circuitry to reach said predetermined cut-off voltage within the normal time duration of said pulse, such charge time to said predetermined cut-off voltage being less than the time interval between pulses.

12. The device in claim 10 in which means are provided to short the said one transistor.

13. The device in claim 12 in which means are provided to short the said one transistor.

References Cited

UNITED STATES PATENTS

| | | | |
|---|---|---|---|
| 3,033,994 | 5/1962 | Fujimoto et al. | 307—228 |
| 3,068,367 | 12/1962 | Brown et al. | 307—234 |
| 3,093,756 | 6/1963 | Rywak | 307—234 |
| 3,138,759 | 6/1964 | Thompson | 328—140 X |
| 3,264,496 | 8/1966 | Scholl | 328—138 X |
| 3,305,732 | 2/1967 | Grossman et al. | 328—138 X |

JOHN S. HEYMAN, *Primary Examiner.*